United States Patent [19]
Ishikawa et al.

[11] Patent Number: 5,568,607
[45] Date of Patent: Oct. 22, 1996

[54] APPARATUS, SYSTEMS AND METHODS FOR CONTROLLING POWER CONSUMPTION IN A SELECTIVELY ENABLED PROCESSING SYSTEM

[75] Inventors: Mamoru Ishikawa, Tokyo, Japan; Christen V. Nielsen, Dunedin, Fla.

[73] Assignees: International Data Matrix, Inc., Nashua, N.H.; Tokyo Electric Company, Ltd., Tokyo, Japan

[21] Appl. No.: 292,863

[22] Filed: Aug. 19, 1994

[51] Int. Cl.$^6$ .............................. G06F 11/34; G06F 1/18
[52] U.S. Cl. ...................... 395/182.20; 395/750
[58] Field of Search .................. 395/180, 182.12, 395/182.20, 750; 235/472, 462, 467; 307/38, 64, 66, 45

[56] References Cited

U.S. PATENT DOCUMENTS

| | | | |
|---|---|---|---|
| 4,511,888 | 4/1985 | Bernhardt | 340/571 |
| 4,559,529 | 12/1985 | Bernhardt | 340/571 |
| 4,663,539 | 5/1987 | Sharp et al. | 307/38 |
| 4,766,300 | 8/1988 | Chadima, Jr. et al. | 235/472 |
| 5,081,343 | 1/1992 | Chadima, Jr. et al. | 235/472 |
| 5,229,591 | 7/1993 | Heiman et al. | 235/472 |
| 5,423,045 | 6/1995 | Kannan et al. | |
| 5,511,205 | 4/1996 | Kannan et al. | 395/750 |

FOREIGN PATENT DOCUMENTS 63-272328  11/1988  Japan.
5303509  11/1993  Japan.

*Primary Examiner*—Robert W. Beausoliel, Jr.
*Assistant Examiner*—Albert Decady
*Attorney, Agent, or Firm*—Orrick, Herrington & Sutcliffe

[57] ABSTRACT

Apparatus, systems and methods are provided for controlling energy consumption by a selectively enabled processing system, such as a high-density code scanner. The selectively enabled processing system has at least one high-power consumption microprocessor which does not include a low-power consumption mode. Also included are a power-supply, a switch and a trigger for turning ON and OFF the power-supply, and means for performing diagnostics. The performing diagnostics means operate on at least a portion of the selectively enabled processing system whenever the power-supply is initially switched ON, and inhibit the power-supply upon diagnostics completion. The trigger selectively enables means for causing the microprocessor to consume the power-supply for a pre-set time period while processing, and then inhibit the power-supply upon expiration of the time period without re-performing diagnostics.

41 Claims, 3 Drawing Sheets

APPARATUS, SYSTEMS AND METHODS FOR CONTROLLING POWER CONSUMPTION IN A SELECTIVELY ENABLED PROCESSING SYSTEM

TECHNICAL FIELD OF THE INVENTION

The present invention relates generally to controlling power consumption and improving processing systems, and more particularly to hand held equipment for scanning (reading) and decoding coded symbols.

BACKGROUND OF THE INVENTION

Microprocessor controlled devices for scanning (reading) bar code symbols powered by batteries are known. As used herein, the term microprocessor refers to a central processing unit ("CPU") of a computer or microcomputer which is an integrated circuit and is used to control the operation of a processing system that performs data processing functions.

One such bar code reader includes a light generating and sensing circuit for reading a bar code, a microprocessor for processing the read bar code, and a power-supply circuit. The power-supply circuit connects the reader and a battery to provide power to the reader. Once powered, i.e., turned on, the reader continuously drains the battery regardless of whether or not the reader is actively reading bar codes. Another such bar code reader includes a slower microprocessor capable of shifting internally between a processing mode and an idle mode. During the processing mode, the microprocessor consumes battery power to process the read bar codes. During the idle mode, the microprocessor consumes less power as it remains idle. This version has a relatively reduced power consumption and has a longer useful life than the continuously operating version.

In recent years, however, high information density codes, such as two dimensional codes, including, for example, matrix codes, stacked bar codes and the like, have come into commercial use and acceptance. In some instances, two dimensional codes have replaced bar codes because bar codes cannot store as much information per unit area as the two dimensional codes. One such two dimensional code is an optically readable binary matrix code, as is more fully described with reference to U.S. Pat. No. 4,939,354, entitled "Dynamically Variable Machine Readable Binary Code and Method for Reading and Producing Thereof", commonly owned by the assignee of this patent document, and which is incorporated herein by reference.

One problem associated with utilizing two dimensional codes is that a relatively longer time is required to decode them because they contain more information than standard bar codes. Additionally, a problem exists in that, to decode these high density codes without considerable time delays, a high speed microprocessor is required, which acts to process quickly the scanned data to decode the symbol, and which thereby consumes a large amount of power. Unlike the reduced power consumption versions of the aforementioned conventional reader, many suitable high speed microprocessors are not designed with a low power consumption mode and, therefore, power consumption cannot be sufficiently reduced, even when data is not being decoded. Further, if the power-supply circuit connecting the portable code reader and a battery is arranged so as to be turned ON by a trigger switch, for example, when an operator wants to scan a code, a diagnostics check of the hardware components, common to high speed microprocessor processing systems, is repeated every time the microprocessor is activated by the trigger switch. Consequently, a considerable and noticeable time delay will be encountered after the trigger and before the start of a code read, or completion of a successful code read and decode operation. Excessive power consumption by selectively enabled microprocessor processing systems utilizing the high-speed microprocessor remains a continuing problem and obstacle to producing commercially useful portable, hand held scanning products, particularly in the two dimensional code field where the computational demands are great and the end user consumers expect nearly instantaneous read results. Relatively lengthy successful read delays are particularly commercially unacceptable in applications where the high density codes are being read while moving from one location to another and where performing diagnostic checks.

It is, therefore, an object of the present invention to provide apparatus, systems and methods for controlling the consumption of a power-supply by a selectively enabled processing system having a high speed microprocessor wherein the microprocessor does not include a low power consumption mode.

Another object of the present invention is to provide apparatus, systems and methods for performing diagnostics on a portion of a selectively enabled processing system when the power-supply is initially applied thereto, and thereafter operating an enabled processing system to process data without performing any diagnostics.

A further object of the present invention is to provide apparatus, systems and methods for permitting the selectively enabled processing system to consume the power-supply while processing data and to inhibit power consumption when data processing is complete.

A still further object of the present invention is to efficiently and inexpensively control consumption of power in selectably enabled high density code scanners.

SUMMARY OF THE INVENTION

The present invention is directed to controlling power consumption in selectively enabled processing systems, and in particular, in high density code scanners. One aspect of the invention therefore concerns a method of operation for a triggerable, selectively enabled microprocessing system. The system includes at least one high-power consumption microprocessor, an on-off switch and a trigger switch. Preferably, the microprocessor does not include a low-power consumption mode. One such method of operation includes the steps of (a) switching the on-off switch, which couples a power-supply to the system, from an OFF state to an ON state, wherein the ON state has both an ON active-state in which the system consumes energy from the power-supply and an ON standby-state in which the system substantially does not consume energy from the power-supply; (b) entering the ON active-state in response to the switch changing from the OFF state to the ON state thereby enabling the microprocessor to consume power and perform a diagnostic function on at least a portion of the system; (c) changing to the ON-standby state following the diagnostic function; (d) detecting a first input signal indicating a triggering event; (e) reentering the ON active-state from the ON standby-state for a time period thereby enabling the microprocessor to consume power; and (f) returning to the ON standby-state from the ON active-state at the end of the time period.

Another aspect of the invention concerns a method of operation for operating a selectively enabled microprocessing device having at least one high-power consumption microprocessor which does not include a low-power consumption mode. The method of operation includes (a) turning the device on and in response to applying a power-supply voltage from a power-supply to the device; (b) performing diagnostics on at least a portion of the device in response to step (a); (c) inhibiting the application of the power-supply voltage to the device; (d) triggering the device and applying the power-supply voltage to the device for a predetermined time period in response to a triggering event; (e) operating the device to perform a processing function in response to the application of the power-supply voltage; and (f) returning to step (c) upon the expiration of the time period. Preferably, the predetermined time period is more than enough time for the microprocessor to complete the desired processing function.

A further aspect of either of the above methods of operation is the inclusion of the step of reading an image on the surface of an article following or contemporaneous with the triggering event as will be described. Preferably, the reading step further includes the steps of (1) producing a radiation beam and directing it to intersect the image; (2) sensing radiation incident to the image; and (3) generating an output signal representative of the sensed radiation. Preferably, step (1) occurs in response to the trigger, and steps (2) and (3) follow in sequence. In another preferred embodiment of the foregoing, the processing function of step (e) processes the output signal representative of the sensed radiation to decode a symbol whose image is illuminated by the radiation beam.

A processing system, in accordance with the principles of the present invention, for controlling power consumption by a selectively enabled microprocessing device includes at least one high-power consumption microprocessor. The microprocessor preferably does not include a low-power consumption mode. The processing system further includes (a) means for selectively applying a power-supply voltage from a power-supply to the device; (b) a trigger, having an output signal corresponding to a triggering event, to selectively enable the applying means; (c) means, enabled when the power-supply voltage is initially applied to the device, for performing diagnostics on at least a portion of the device and for inhibiting the applying means upon diagnostics completion; and (d) means, enabled by the trigger output signal, for restoring and maintaining the applying means for a time period and for inhibiting the applying means upon the expiration of the time period.

Another aspect of the invention concerns an apparatus for controlling consumption of power in a selectively enabled microprocessing system. One such system includes a trigger circuit, a voltage detecting circuit, a processing system, and a power-supply circuit. The trigger circuit has an output signal corresponding to a triggering event. The voltage detecting circuit has an input and an output, wherein the output has a first output signal in response to the presence of a power-supply voltage at the input and a second output signal in response to the absence of the power-supply voltage at the input. The processing system has a power input, a high-power consumption microprocessor having an information processing state which consumes power and an inactive state which consumes de minimis power as compared with the information processing state, and a control output having a time duration. The power-supply circuit is interposed between the power-supply voltage and the system power input, and has a power output and an input for each one of the following: the power-supply voltage, the trigger circuit output, the voltage detecting circuit output, and the system control output. The power-supply circuit is preferably in either one of two states, a first state for providing power at the power output and a second state for not providing power at the power output. The power-supply circuit changes from the second state to the first state in response to either the voltage detecting circuit output changing from the first signal to the second signal, or the presence of the trigger circuit output signal. In contrast, the power-supply circuit changes from the first state to the second state in response to either the end of the duration of the processing system control output signal, or the voltage detecting circuit output changing from the second signal to the first signal. The apparatus further includes means for performing diagnostic functions on the microprocessing system in response to the power-supply circuit changing from the first state to the second state in the absence of a trigger circuit output signal, and not performing the diagnostic functions in response to a trigger circuit output.

Another aspect of the present invention is directed to an apparatus for controlling consumption of a power-supply by a selectively enabled scanning system for scanning an image on the surface of an article. One such apparatus includes a power-supply circuit, a detection circuit, a trigger circuit and a control circuit. The power-supply circuit has a first state wherein the power-supply circuit supplies a voltage from a main power-supply to the selectively enabled scanning system, and a second state wherein the power-supply circuit does not supply the voltage. The detection circuit, interfaced between the selectively enabled scanning system and the main power-supply, detects the initial presence of the voltage and drives the power-supply circuit to the first state. The trigger circuit, coupled with the power-supply circuit, drives the power-supply circuit to the first state in response to a triggering condition. The control circuit includes performing diagnostic means, enabled when the detection circuit detects the initial presence of the voltage, for testing at least a portion of the system, maintaining means responsive to the triggering condition for maintaining the power-supply circuit in the first state for a time period, and driving means for driving the power-supply circuit to the second state.

A further aspect of the above systems and apparatus concerns the inclusion of image reading means for reading an image on the surface of an article. Preferably, the image reading means includes means for sensing radiation incident to the image on the surface of the article and means for generating a signal output of data signals representative of the sensed radiation.

A further aspect of the methods, systems and apparatuses concerns the image read, which may include one or more high density codes, such as an optically readable binary code, and the processing system, which operates on the signal output of data signals to decode the read codes.

Accordingly, an advantage of the present invention is the ability to provide, simply and inexpensively, apparatus, systems and methods for controlling the consumption of a power-supply by a selectively enabled microprocessing system having a high speed microprocessor, wherein the microprocessor is not operated in, and preferably does not include, a low power consumption mode. This advantageously permits the use of low-cost, highly reliable mass-produced microprocessor devices in an application for which they are apparently unsuitable. This also results in improved manufacturability at a lower cost.

Another advantage of the invention is the ability to provide apparatus, systems and methods for performing diagnostics on a portion of the selectively enabled processing system when the power-supply is initially applied to the selectively enabled processing system, and not thereafter, thereby effectively reducing the time required to process data and the power consumption as a result of not performing the diagnostics for each processing operation.

A further advantage of the invention is the ability to provide apparatus, systems and methods for selectively enabling, i.e., triggering, the already selectively enabled processing system, i.e., powered-up or turned on system, to consume the power-supply while processing data and to inhibit power consumption when data processing is complete.

A still further advantage of the invention is the ability to provide apparatus, systems and methods for efficiently and inexpensively controlling the consumption of power in a selectively enabled high density code scanner.

The foregoing has outlined rather broadly the features and advantages of the present invention in order that the detailed description of the invention that follows may be better understood.

BRIEF DESCRIPTION OF THE DRAWINGS

For a more complete understanding of the present invention, and the advantages thereof, reference is now made to the following descriptions taken in conjunction with the accompanying drawings, wherein like numbers designate like parts, and in which.

DETAILED DESCRIPTION OF THE INVENTION

Figure 1:
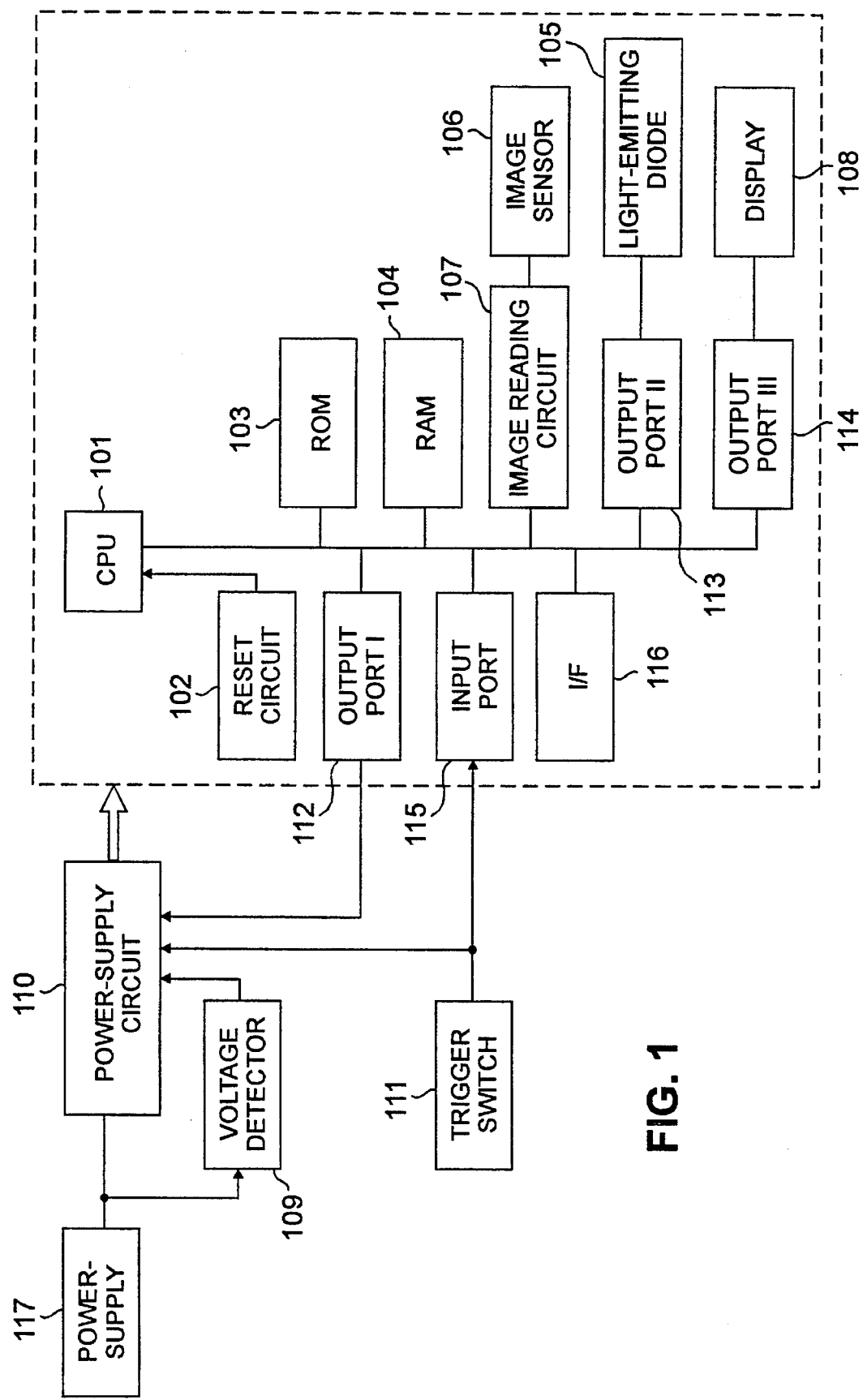
FIG. 1 illustrates a functional block diagram of a portable selectively enabled processing system in accordance with the principles of the present invention.
Figure 2:
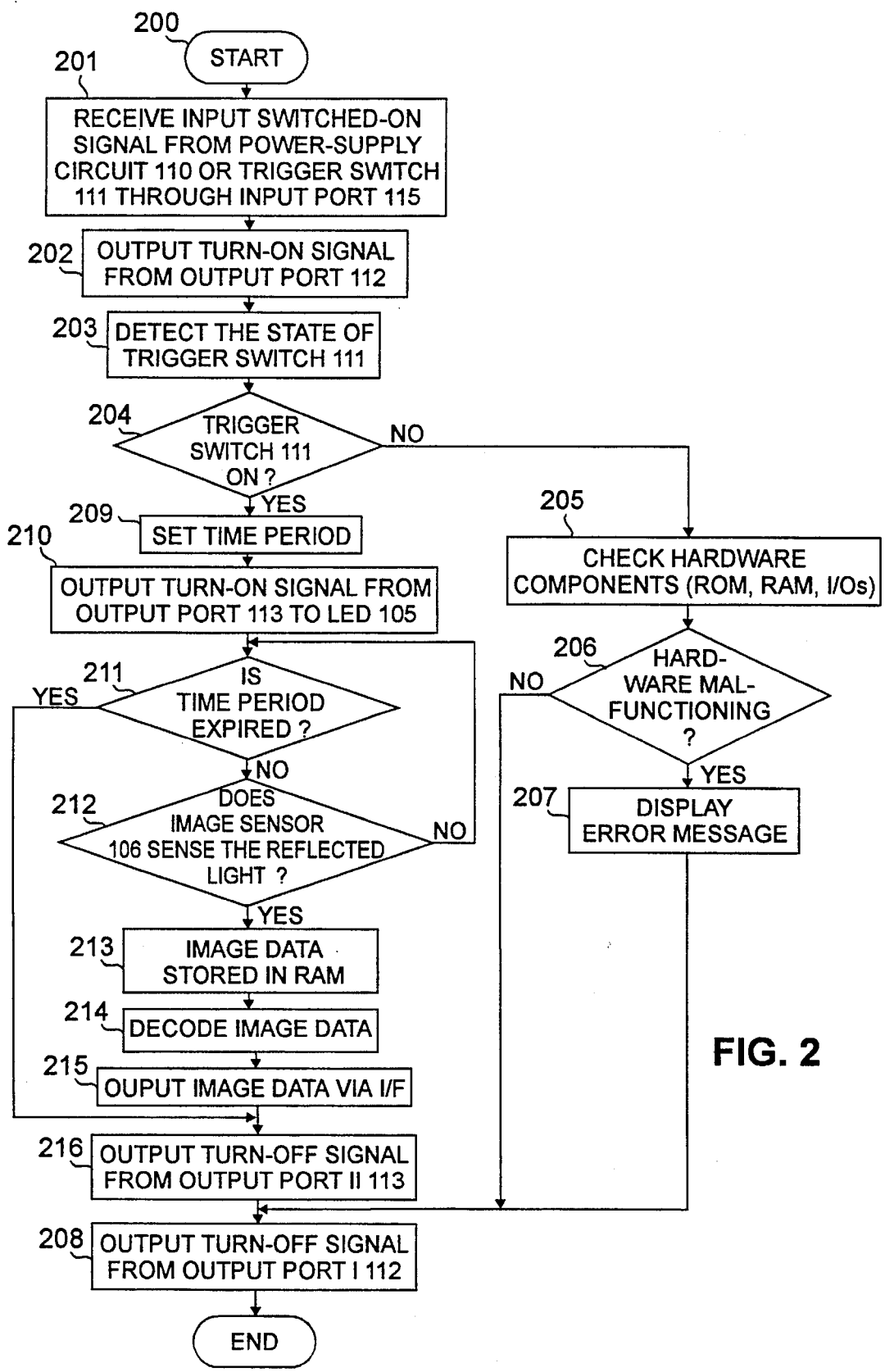
FIG. 2 illustrates a flow diagram of a method for controlling power consumption within the portable selectively enabled processing system set forth in FIG. 1.
Figure 3:
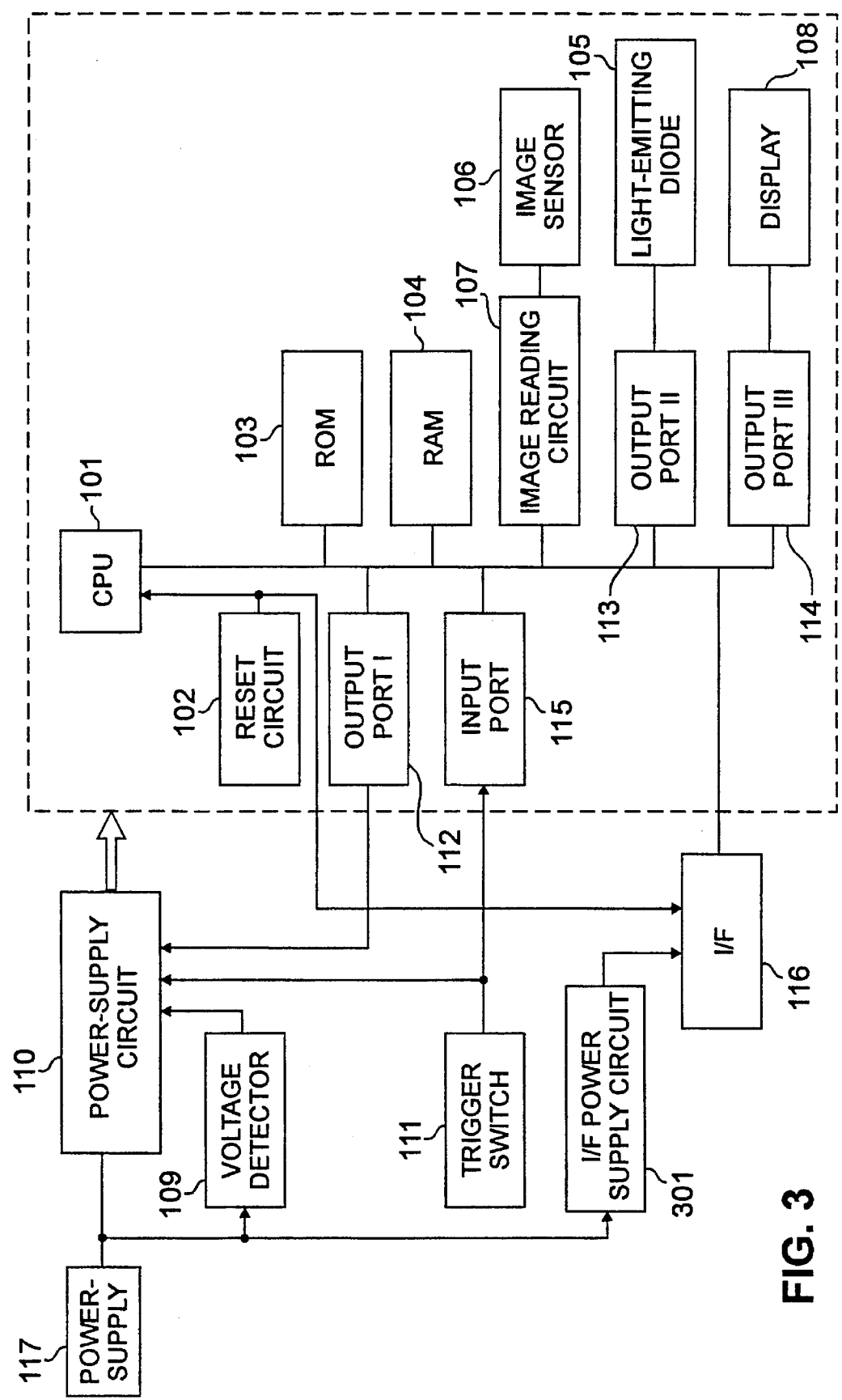
FIG. 3 illustrates a functional block diagram of an alternate embodiment of the portable selectively enabled processing system illustrated in FIG. 1.

The principles of the present invention, and the features and advantages thereof, are better understood by referring to the illustrated embodiment depicted in FIGS. 1–3 of the drawings.

FIG. 1 illustrates a functional block diagram of a portable selectively enabled processing system, a high-density code scanner, in accordance with the principles of the present invention. The high density code scanner includes a microprocessor 101, a reset circuit 102, memory storage devices 103–104, image-reading elements 105–107, a display 108, a voltage detector circuit 109, a power-supply circuit 110, a trigger switch 111, a plurality of output ports I–III 112–114, an input port 115, an interface circuit 116 and a power-supply 117. The microprocessor 101, as previously introduced, performs processing operations which preferably includes arithmetic and logic operations, and decoding and executing various processing instructions. The processing instructions direct the microprocessor to perform the processing tasks of the system. One suitable and preferred microprocessor 101 for utilization with the illustrated embodiment is AM29200, which is available from Advanced Micro Devices, Inc., located in Sunnyvale, Calif., USA. The reset circuit 102 is a switching circuit which preferably restores the scanner to a prescribed OFF state. The memory storage devices include a read only memory ("ROM") 103 and a random access memory ("RAM") 104. ROM 103 preferably stores the processing instructions to be used for controlling microprocessor 101. RAM 104 preferably provides temporary storage, i.e., a work area, for microprocessor 101. Although ROM 103 and RAM 104 have been utilized in the illustrated embodiment, other suitably arranged memory storage devices may be used in addition to or in substitution for the illustrated memory storage devices 103, 104.

The image-reading elements of the illustrated embodiment include a light emitting diode 105 ("LED"), an image sensor 106 and an image-reading circuit 107. The LED 105 provides spontaneous and non-coherent electro-magnetic radiation at visible and near infrared wavelengths, and preferably directs the radiation to intersect an image imprinted upon the surface of an article. The image sensor 106 senses the intersected radiation reflected from the surface of the article and generates representative electrical data signals. The image-reading circuit 107 converts the electrical data signals into corresponding image data signals. The preferred image reading elements 105–107 for utilization with the illustrated embodiment include a light and a targeting LED, namely, light LEDs BR1101W, which is available from Stanley Electric Company, Ltd., located in Tokyo, Japan, and SLP-881A-50 and SLP-881F-37, which are available from Sanyo Electric Co., Ltd., located in Osaka, Japan, and targeting LED TLRA180AP, which is available from Toshiba Corp., located in Tokyo, Japan; an image sensor, namely, ICX 039 BLA, which is available from Sony Corp., located in Tokyo, Japan; and image-reading circuitry, including CXD1265R, CXD1159Q, CXA1310AQ, CXD1250M, which are available from Sony Corp., located in Tokyo, Japan. Although infrared LED technology has been utilized in the illustrated embodiment, any suitable arrangement of an optical sensor, and, if necessary, an optical source, for scanning and examining images incident to the surface of an article may be readily used in addition to or substituted for the described image-reading elements, including CCD technology, and/or other video frame grabber devices, for examples.

The display 108 preferably generates an alphanumeric display image on a conventional LCD or LED display device which informs an operator of the scanner's accuracy, processing status, etc., or simply displays the processed image data. Although the display 108 is illustrated, any other suitably arranged indicting means, such as an audible indicator, e.g., a tone or a buzzer, or a tactile sensor, e.g., which vibrates, or indicator LEDs having predetermined legends, may be readily used in addition to or substituted for the display 108.

The power-supply circuit 110 includes both ON and OFF control terminals and provides an interface between the scanner and the power-supply 117. In one embodiment, the power-supply circuit 110 is a latch, reversing and maintaining its state each time power is supplied. The voltage detector 109 detects when a power-supply voltage is applied to the power-supply circuit 110 and maintains the power-supply circuit 110 in an ON state, via the control terminals, for a pre-set period of time.

The trigger switch 111 generates an output signal corresponding to a triggering event for selectively enabling, via the control terminals, the power-supply circuit 110. The trigger switch 111 has ON and OFF states, and is preferably automatically restored to a prescribed OFF state. In one embodiment, the trigger switch 109 is a latch, as previously described hereinabove. The plurality of output ports I–III 112–114 each provides an interface between the microprocessor 101 and various hardware devices, namely, the power-supply circuit 110, the LED 105 and the display 108, respectively, whereby the microprocessor 101 provides control signals directing the various hardware devices to perform specific tasks. Preferably, the reset circuit 102 enters a reset OFF state as a result of the power-supply circuit 110 entering a prescribed OFF state, and to an ON standby state when output port I 112 is off. The input port 115 provides an interface through which the microprocessor 101 receives the output signal generated by the trigger switch 111. The interface circuit 116 provides an interface between the scanner and an external device (not shown), such as, for example, another processing system. Thus, the high density code scanner is applicable for use with a warehousing system wherein the code read by the scanner is decoded and displayed to the operator, and transmitted by a telemetry protocol to a main processing system for, e.g., inventory control.

The power-supply 117 provides a power-supply voltage to the scanner. In the illustrated embodiment, the power-supply 117 is an internal battery, however, any suitably arranged power-supply, internal or external, may be readily utilized.

FIG. 2 illustrates a flow diagram of a preferred method for controlling power consumption within the portable selectively enabled processing system illustrated in FIG. 1. Upon entering START block 200, a switch, coupling the power-supply 117 with the power-supply circuit 110, is switched from an OFF state to an ON state. During the OFF state, the power-supply 117 is disconnected from the scanner, while, during the ON state, the power-supply 117 and the scanner are connected. Preferably, the ON state has an ON active-state during which the scanner system consumes energy from the power-supply 117 and an ON standby-state during which the scanner system substantially does not consume energy from the power-supply 117. The power-supply circuit 110 assumes the ON active state. The microprocessor 101 receives an input switched-on signal from either the power-supply 110 or the trigger switch 111 through input port 115 (block 201). The microprocessor 101 in response thereto, supplies a turn-on signal via the output port I 112 to the power-supply circuit 110 causing the power-supply circuit 110 to remain in the ON active-state (block 202), regardless of whether the voltage detector 109 and the trigger switch 111 are subsequently turned off. The microprocessor 101 reads the state of the trigger switch 111 through the input port 115 (block 203). If the trigger switch 111 is OFF (the "NO" branch of decisional block 204), then the voltage-detecting circuit 109 has turned on the power-supply circuit 110, causing the microprocessor 101 to perform diagnostics on at least a portion of the scanner system, including, for example, ROM 103, RAM 104, etc. (block 205). Upon a determination that a portion of the scanner is malfunctioning (the "YES" branch of decisional block 206), an error or status message indicating the problem and/or its cause is preferably displayed by the microprocessor 101 via output port III 114 to the display 108 or other indicating device (block 207). In one alternate embodiment, the message is supplied to an external device through the interface circuit 116. Alternatively, upon a determination that the scanner is functioning properly, the microprocessor 101 supplies a turn-off signal via the output port I 112 to inhibit the power-supply circuit 110 (block 208).

If the trigger switch 111 is ON (the "YES" branch of decisional block 204), then the trigger switch 111 has selectively enabled the power-supply circuit 110, which preferably causes the microprocessor 101 to set, and count down, a time period during which all scanning, and subsequent processing operations, must occur (block 209). The microprocessor 101 supplies a turn-on signal via the output port II 113 to the LED 105 (block 210). The turn-on signal causes the LED 105 to generate a light beam which is preferably directed to intersect an image on the surface of an article.

If the image sensor 106 does not sense the reflected light (the "NO" branch of decisional block 212) then the process re-determines whether the time period has expired (block 211). If no image data is input to the microprocessor 101 within the time period, the microprocessor 101 supplies an output turn-off signal from output ports I–II 112–113 to LED 105 and the power-supply circuit 110, respectively (the "YES" branch of decision block 211). If the image sensor 106 senses the light reflected from the image (the "YES" branch of decisional block 212), then the image sensor 106 converts the reflected light sensed into electric signals. The image reading circuit 107 converts the electrical signals into image data signals and stores them in RAM 104 (block 213). The microprocessor 101 preferably decodes the image data signals stored in RAM 104 (block 214) according to a decode algorithm for the code being scanned. Although any code symbols may be used with the present invention, one suitable code symbology is the DATA MATRIX symbol of International Data Matrix, Inc., of Clearwater, Fla., USA, which is understood with reference to the aforementioned U.S. Pat. No. 5,324,923, additionally one such decode processing function involves authenticating self-verifying articles, as is more fully described with reference to copending patent application, U.S. Ser. No. 08/280785 filed Jul. 26, 1994, entitled "Methods and Systems for Creating and Authenticating Unalterable Self-verifying Articles," commonly owned by the assignee of these patent documents, and which are incorporated herein by reference.

The decoded image data signals are supplied to the display 108, or via the interface circuit 116 to an external device, or both (block 215). The microprocessor 101 supplies a turn-off signal via the output port II 113 to the LED 105 (block 216), and via the output port I 112 to the power-supply circuit 110 (block 208). In one embodiment of the invention, upon completion of the data-decoding operation, the operator is notified by means of the display 108, an audible or tactile alarm device (not shown), or other indicating device.

In another embodiment, upon completion of the data decoding operation, the microprocessor 101 extends, or re-starts, the time period, thereby entering a waiting state instead of supplying a turn-off signal to the power-supply circuit 110. Thus, the selectively enabled scanner is caused to wait for other image data from the image-reading circuit 107 for a time period. If the time period expires prior to an image being scanned, via image sensor 106, the microprocessor 101 generates an output turn-off signal from output ports I–II 112–113 to the LED 105 and the power-supply circuit 110, respectively, (the "YES" branch of decisional branch 211).

FIG. 3 illustrates a functional block diagram of an alternate embodiment of the portable selectively enabled high density code scanner illustrated in FIG. 1. This alternate embodiment of the scanner differs from the first embodiment in two respects. First, an interface power-supply circuit 301 is coupled between the interface circuit 116 and the power-supply 117, enabling the interface circuit 116 to receive the power-supply voltage from the power-supply 117. Second, the interface circuit 116 is coupled with the reset circuit 102 enabling the interface circuit 116 to receive a reset signal from the reset circuit 102. Thus, while the power-supply circuit 110 is maintained in the OFF state, the reset circuit 102 and the power-supply 117 supply the reset signal and power-supply voltage, respectively, to the interface circuit 116, causing the output of the interface circuit, which is supplied to an external device, to remain stable regardless of the state of the power-supply circuit 110.

Although the present invention and its advantages have been described in detail, it should be understood that various changes, substitutions and alterations can be made herein without departing from the spirit and scope of the invention.

We claim:

1. A method for operating a triggerable, selectively enabled microprocessing system having at least one high-power consumption microprocessor, an on-off switch and a trigger switch, said high-power consumption microprocessor not including a low-power consumption mode, said method comprising the steps of:

switching an on-off switch in an OFF state to an ON state, said switch coupling a power-supply to said selectively enabled microprocessing system using said on-off switch, said OFF state for disconnecting said power-supply from said selectively enabled microprocessing system and said ON state for connecting said power-supply to said selectively enabled microprocessing system, said ON state having an ON active-state in which said selectively enabled microprocessing system consumes energy from said power-supply and an ON standby-state in which said selectively enabled microprocessing system substantially does not consume energy from said power-supply;

placing said selectively enabled microprocessing system in said ON active-state in response to said switch changing from said OFF state to said ON state thereby enabling said high power consumption microprocessor to consume power and perform a diagnostic function on at least a portion of said selectively enabled microprocessing system in response thereto;

changing said selectively enabled microprocessing system from said ON-active state to said ON-standby state following said diagnostic function;

detecting a first input signal indicating a triggering event;

returning said selectively enabled microprocessing system from said ON standby-state to said ON active-state for a set time period thereby enabling the high power consumption microprocessor to perform a function other than said diagnostic function; and restoring said enabled selectively microprocessing system from said ON active-state to said ON standby-state at the end of said time period.

2. The method as set forth in claim 1 wherein said returning step further includes the step of:

reading an image imprinted upon the surface of an article.

3. The method as set forth in claim 2 wherein said reading step further includes the steps of:

producing a radiation beam and directing said radiation beam to intersect said image imprinted on the surface of said article;

sensing radiation incident to said image; and generating an output signal representative of said sensed radiation.

4. The method as set forth in claim 3 wherein said image includes at least one optically readable binary code.

5. The method as set forth in claim 1 wherein said returning step further includes the steps of:

receiving a second input signal; and directing said high-power consumption microprocessor to process said second input signal to generate a data output signal.

6. A system for controlling the power consumption of a selectively enabled microprocessing device having at least one high-power consumption microprocessor, said high-power consumption microprocessor not including a low-power consumption mode, said system comprising:

means for selectively applying a power-supply voltage from a power-supply to said microprocessing device;

a trigger, having an output signal corresponding to a triggering event, for selectively enabling said applying means;

means, enabled when said power-supply voltage is initially applied to said microprocessing device, for performing diagnostics on at least a portion of said portable processing device and for inhibiting said applying means upon diagnostics completion; and means, enabled by said trigger output signal, for restoring and maintaining said applying means for a set time period thereby enabling said microprocessing device to perform a function other than diagnostics and for inhibiting said applying means upon the expiration of said time period.

7. The system as set forth in claim 6 wherein said system further includes:

a voltage detecting circuit interfaced between and coupling said applying means and said performing diagnostics means, said voltage detecting circuit having an input and an output, said output having a first output signal in response to the presence of said power-supply voltage at said input and a second output signal in response to the absence of said power-supply voltage at said input.

8. The system as set forth in claim 6 wherein said selectively enabled microprocessing device further includes image-reading means for reading an image imprinted upon the surface of an article, said image-reading means having a power input.

9. The system as set forth in claim 8 wherein said image-reading means further comprises:

means for sensing radiation incident to an image imprinted on an article; and means for generating a signal output of data signals representative of said sensed radiation.

10. The system as set forth in claim 9 wherein said microprocessor includes means for decoding said signal output of data signals in response to a trigger switch output.

11. The system as set forth in claim 10 wherein said image includes at least one optically readable binary matrix code.

12. The system as set forth in claim 9 wherein said image-reading means further includes a light emitting diode and said microprocessor is operable to process said signal output of data signals to generate processed data signals.

13. The system as set forth in claim 6 wherein said performing means further comprises means for generating a signal output of data signals upon a determination that any portion of said selectively enabled microprocessing device is malfunctioning and further comprises means for informing an operator of a malfunction.

14. The system as set forth in claim 6 wherein said restoring and maintaining means further include:

means for receiving a data input signal; and said microprocessor is operable to process said data input signal to generate a processed output signal.

15. The system as set forth in claim 14 wherein said microprocessor resets said time period.

16. The system as set forth in claim 6 wherein said selectively applying means is a latch.

17. The system as set forth in claim 6 wherein said trigger is a latch.

18. A method for operating a selectively enabled microprocessing device having at least one high-power consumption microprocessor, said high-power consumption microprocessor not including a low-power consumption mode, said method comprising the steps of:

(a) turning said selectively enabled microprocessing device on in response to applying a power-supply voltage from a power-supply to said selectively enabled microprocessing device;

(b) performing diagnostics on at least a portion of said selectively enabled microprocessing device in response to step (a);

(c) inhibiting the application of said power supply voltage to said selectively enabled microprocessing device after step (b);

(d) triggering said selectively enabled microprocessing device and applying said power supply voltage to said selectively enabled microprocessing device for a set time period in response to said triggering event; and (e) operating said selectively enabled microprocessing device for said time period to perform a processing function other than a diagnostic function in response to the application of said power supply voltage.

19. The method as set forth in claim 18 further comprising the step of:

(f) returning to one of step (c) upon the expiration of said time period and to step (d) upon the occurrence of a triggering event during said time period.

20. The method of claim 19 further comprising the step of turning said selectively enabled microprocessing device off.

21. The method as set forth in claim 19 wherein said performing diagnostics step includes the step of:

detecting the presence of said power-supply voltage.

22. The method as set forth in claim 19 wherein step (e) includes the step of:

reading an image on the surface of an article.

23. The method as set forth in claim 22 wherein said reading step includes the steps of:

sensing radiation incident to said image on the surface of said article;

generating a signal output of data signals representative of said sensed radiation; and decoding said signal output of data signals to generate a decoded output signal.

24. The method as set forth in claim 19 wherein step (e) includes the step of:

reading an image having at least one optically readable binary code imprinted upon the surface of an article;

generating a signal output of data signals representative of optically readable binary code; and decoding said signal output of data signals to generate a decoded output signal.

25. The method of claim 19 wherein step (b) further comprises the step of:

determining whether a triggering event has occurred and, if so, performing step (d) without performing step (b).

26. An apparatus for controlling consumption of a power-supply by a selectively enabled scanning system for scanning an image on the surface of an article, said scanning system including a high power consumption microprocessor which does not have a low power consumption mode, said apparatus comprising:

a power-supply circuit having a first state wherein said power-supply circuit supplies a voltage from a main power-supply to said selectively enabled scanning system, and a second state wherein said power-supply circuit does not supply said voltage;

a detection circuit, interfaced between said selectively enabled scanning system and said main power-supply, for detecting the initial presence of said voltage and driving said power-supply circuit to said first state;

a trigger circuit connected to said power-supply circuit for driving said power-supply circuit to said first state in response to a triggering condition; and a control circuit including:

means, enabled when said detection circuit detects the initial presence of said voltage, for performing diagnostics on at least a portion of said selectively enabled scanning system;

means, responsive to said triggering condition, for maintaining said power-supply circuit in said first state for a set time period to perform a processing function other than diagnostics; and means for driving said power-supply circuit to said second state at the end of said time period.

27. The apparatus as set forth in claim 26 wherein said selectively enabled scanning system further includes image-reading means for reading said image on the surface of said article, said image including at least one optically readable matrix code.

28. The apparatus as set forth in claim 29 wherein said optically readable binary code includes at least one matrix code.

29. The apparatus as set forth in claim 27 wherein said image-reading means includes:

means for sensing radiation incident to said image; and means for generating an output signal of data signals representative of said sensed radiation.

30. The apparatus as set forth in claim 29 wherein said control circuit further includes means for processing said signal output of data signals.

31. The apparatus as set forth in claim 27 wherein said maintaining means further includes means for generating and transmitting a control signal to said image-reading means, said control signal operable to control said image-reading means.

32. The apparatus as set forth in claim 26 wherein said performing diagnostics means further includes means for generating a signal output of data signals upon a determination that any portion of said selectively enabled processing system is malfunctioning.

33. The apparatus as set forth in claim 26 wherein said power-supply circuit is a latch.

34. Apparatus for controlling consumption of power in a selectively enabled processing system, said processing system having a power input, a high-power consumption microprocessor not including a low power consumption mode, and a control output having a set time duration, comprising:

a trigger circuit having an output signal corresponding to a triggering event;

a voltage detecting circuit having an input and an output, said output having a first output signal in response to the presence of a power-supply voltage at said input and a second output signal in response to the absence of said power-supply voltage at said input;

a power-supply circuit interposed between said power-supply voltage and said selectively enabled processing system power input, said power-supply circuit having a power output and an input for said trigger circuit output, said voltage detecting circuit output, and said selectively enabled processing system control output, said power-supply circuit being in one of a first state for providing power at said power output and a second state for not providing power at said power output wherein:

said power-supply circuit changes from said second state to said first state in response to one of said voltage detecting circuit output changing from said first signal to said second signal and said trigger circuit output signal, and said power-supply circuit changes from said first state to said second state in response to one of said end of the time duration of said processing system control output signal and said voltage detecting circuit output changing from said second signal to said first signal;

wherein said processing system further comprises means for performing diagnostic functions on said processing system in response to said power-supply circuit changing from said first state to said second state in the absence of a trigger circuit output signal, and not performing said diagnostic functions in response to a trigger circuit output.

35. The apparatus as set forth in claim 34 further comprising an image capture circuit to receive an image on the surface of an article in response to a trigger output signal, said image capture circuit having a power input and a signal output of data signals representative of said sensed radiation.

36. The apparatus as set forth in claim 35 wherein said image capture circuit further includes a light source to illuminate the surface of said article.

37. The apparatus as set forth in claim 35 wherein said processing system processes said signal output of data signals to generate a processed output signal and said apparatus further includes:

an interface circuit coupling said apparatus with an external device, said interface circuit being operable to receive said processed output signal and supply said processed output signal to said external device.

38. The apparatus as set forth in claim 37 wherein said apparatus further includes:

an interface power-supply circuit connected to said interface circuit for receiving said power-supply voltage and applying said power-supply voltage to said interface circuit;

a reset circuit connected with said interface circuit; and wherein said reset circuit supplies a stabilizing signal to said interface circuit.

39. The apparatus as set forth in claim 34 wherein said performing diagnostic means further comprises means for generating a signal output of data signals upon a determination that any portion of said selectively enabled processing system is malfunctioning.

40. The apparatus as set forth in claim 39 wherein said signal output of data signals is transmitted to indicating means for informing an operator.

41. The apparatus as set forth in claim 34 wherein said power-supply circuit is a latch.

* * * * *